United States Patent Office 3,629,130
Patented Dec. 21, 1971

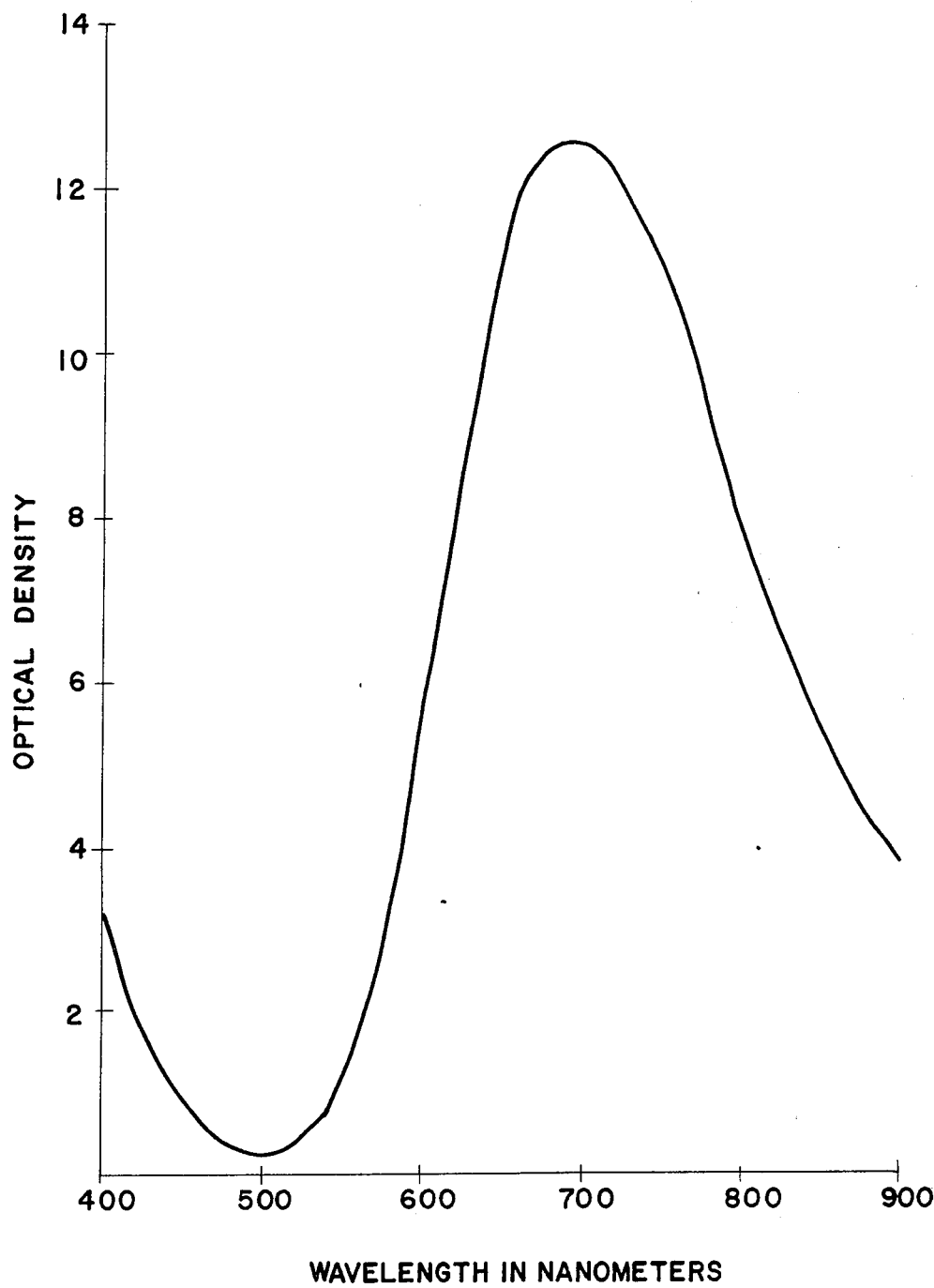

3,629,130
POLYESTER FILTER CONTAINING
COPPER II SALTS
Richard J. Hovey, Sturbridge, Mass., assignor to American Optical Corporation, Southbridge, Mass.
Filed Dec. 15, 1969, Ser. No. 885,053
Int. Cl. F21v 9/04; G02b 2/20
U.S. Cl. 252—300    8 Claims

ABSTRACT OF THE DISCLOSURE

An optical filter for infrared and near infrared wavelengths, particularly useful for shielding against laser light, has a cast polyester matrix formed by polymerizing a monomer containing a dissolved copper (II) salt. The absorption spectra of the case polyester are independent of the particular copper (II) salt.

---

As is well known, laser light is a high energy light in the infrared and near infrared wavelength ranges, and workers in the art require eye protection from the radiation. Optical filters in the form of eye-glasses, face shields, goggles and the like have heretofore been suggested to protect such workers from the high energy radiation.

The known filters, however, are in the form of thin films of plastic which include a composition which provides mental copper or copper cations in the film. For example, U.S. Pat. No. 2,861,896 describes an interference-type filter using elemental copper. In this filter, the finely divided copper particles are dispersed in the film, and the copper particles provide the filter element. The filtering action is based on scattering of light.

In U.S. Pat. No. 2,816,047, a thin film having an organic dye absorbed on the surface is used by securing the plastic to a glass lens or the like. As an example, a polyvinyl alcohol film has aniline absorbed on its surface, and the aniline is reacted with a soluble copper salt. The resulting dye absorbs infrared radiation. The reaction produces mixtures of compounds which have overlapping bands of absorption.

In U.S. Pat. No. 3,104,176, a thin synthetic plastic film is immersed in a copper salt solution, and after drying the copper salts are dispersed on the film's surface and in the film pores. This arrangement provides strictly a surface effect of radiation absorption.

In the prior art, only relatively thin plastic films are used, and these require support as by cementing on glass or other types of lenses. The thinness of the films and particularly the low concentration of copper in and on the films limits the absorption characteristics of these filters. In my copending application Ser. No. 853,636, filed Aug. 28, 1969, for "Optical Filter For Infrared and Near Infrared Wavelengths," I have described a plastic filter which is farmed by first dissolving copper salt in a fully polymerized plastic in solvent, and then forming a filter by evaporating the solvent. The solvent evaporation technique, while producing excellent filters for some purposes, imposes some practical limitations on the thickness and shape of the filters. Furthermore, the absorption spectra of the solvent evaporated vinyl films are strongly dependent on the anions associated with the copper (II) cations of the salt used in the filter.

According to the present invention, there is provided a method and a filter for shielding against infrared and near infrared radiation which polymerizes a monomer containing a dissolved copper (II) salt. One important aspect of the optical filter of the present invention is the high visible transmittance and the very strong absorption at the ruby laser wavelength (694 nanometers). The visible transmittance, or luminous transmittance, refers to transmitting those wavelengths which the human eye can see through the filter.

It is, therefore, among the objects and advantages of the present invention to provide an optical filter for infrared and near infrared wavelengths of predetermined absorption characteristics.

Another object of the invention is to form an optical filter for ruby laser light.

A still further object of the invention is to provide a copper (II) doped plastic filter made of a polyester cast of variable thickness and shape.

Yet another object of the invention is to provide an optical filter, cast of a polyester resin in the final desired shape.

A further object of the invention is to provide an optical filter for infrared absorption having high visible transmittance.

These and other objects may be ascertained from the following description and a single appended drawing which is a graph showing the optical density of a particular filter made according to the invention plotted against wavelength.

In general, the invention provides a polyester optical filter which is self-supporting and suitable for spectacles, eye-shields, goggle lenses and the like, for shielding against infrarer and near infrared wavelengths, and particularly for the ruby laser wavelength of 694 nm. The optical filter of the invention incorporates in an optical quality polyester resin, concentrations of copper (II) salts to provide adequate protection against the high-energy output of ruby lasers. The optical filters of the invention are prepared by casting a polyester resin in a mold of predetermined shape and thickness.

The optical filters are formed of synthetic plastic compositions which are of good optical quality. Polyesters useful for the invention are preferably unsaturated thermo-setting resins generally produced by esterification of poly-basic organic acids with polyhydric alcohols. Most generally, they are unsaturated esters reacted with monomers of the unsaturated vinyl-type, and, in general they are cured by reaction of the carbon-carbon double bond forming a polyester resin. Many types of the polyesters cure at low temperatures and low pressures. In some instances, a linear, unsaturated polyester is reacted with a vinyl monomer, forming cross-linked, three dimensional resins. Copolymers are particularly useful in that they are fast curing, thermosetting, insoluble resins, e.g. copolymers of styrene and glycol maleate. Two types of suitable monomers are employed, (1) unsaturated dibasic acids condensed with saturated glycols, and (2) an unsaturated vinyl-type monomer added for copolymerization. The copolymerization of the monomers forms fast curing, thermosetting insoluble resins. In the allyl type esters, diethylene glycol bis (allyl carbonate), diallyl maleate, diallyl fumarate, diallyl benzene phosphonate, etc. copolymerize with vinyl-type monomers at low temperatures. Diethylene glycol bis (allyl carbonate) made from diethylene glycol is particularly useful as it forms copolymers with vinyl-type monomers which are clear castings having high scratch resistance. Peroxide initiators at relatively low temperatures produce controlled polymerization. Various types of peroxide initiators and azo compounds may be used and these include acetyl benzoyl peroxide, peracetic acid, methyl ethyl ketone peroxide, cyclohexanone peroxide, cyclohexyl hydroperoxide, 2,4-dichlorobenzoyl peroxide, cumene hydroperoxide, etc., all of these forming low temperature curing types in the 30–60 degree centigrade range. The most commonly used vivnyl-type monomers for commercial purposes of making polyesters are those of relatively low cost and these include styrene, vinyl toluene, acrylic and methacrylic esters, vinyl acetate, etc. Various activators and promoters have been used for varying the curing properties of the monomers. For example, cobalt salts have been used with ketone peroxides.

In a specific example, two grams of 30% copper (II) bromide in methanol (or other solvent) are dissolved in 20 gm. of a polyester monomer precursor of a cured resin, commercially sold as "Wards" Bioplastic. To this solution are added 2 gm. of MEK peroxide (catalyst) with vigorous stirring. The mixture is then poured into appropriate molds and allowed to set at room temperature for several hours. Final curing of the plastic composition is achieved by gentle heating at from 140–160 degrees F. for several hours. A number of blue colored plastic plates of various thicknesses were prepared by casting the material in appropriate molds. The amount of copper (II) bromide compound in the finished plastic is approximately 2.5%. Typical absorption spectra for a 3.5 mm. thick sample is shown in the single figure of the drawing which graphically presents the optical density of the filter at different wavelengths and particularly the high optical density at the wavelength 694 nm., the ruby laser wavelength.

In another example, a polyester resin based on poly-(oxydiethylene maleate) and styrene is prepared as follows.

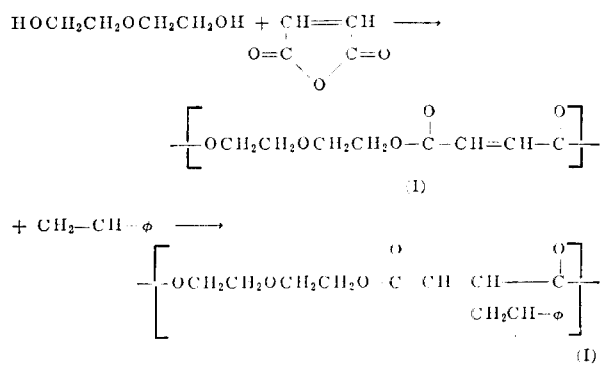

2.2 moles (233.4 gm.) of diethylene glycol is heated to 80° C. while nitrogen is slowly passed through. 2.0 moles (196.1 gm.) of maleic anhydride is added and the temperature of the mixture slowly elevated to 150° C. This should take about one hour. The heat should be temporarily removed at about 100° C. until an exothermic reaction subsides. Then the mixture is heated to 190° C. over a four hour period. The 190° C. temperature is held for approximately one hour while a vacuum of 100–200 torr is applied. The temperature of the mixture is then reduced to 170° C. and is maintained at 170° C. until the acid number of a sample siphoned from the mixture is 50 or less. The vacuum is then removed and the reaction product allowed to cool under nitrogen to approximately 100° C. Approximately 0.02 gm. of an inhibitor such as hydroquinone or p-t-butylcatechol is added. The reaction product is then poured into a sufficient quantity of styrene at 25° C. to give a 70% solution of the desired polyester.

Two grams of 30% copper (II) bromide in methanol (or other solvent) are dissolved in 20 gm. of the polyester matrix previously prepared. Two grams of methyl ethyl ketone peroxide (catalyst) are added to the solution while stirring vigorously. The mixture is then poured in the molds and allowed to cure at room temperature for several hours. Final curing is accomplished by gentle heating at 140–160 degrees F. for several hours.

Other copper salts may be used to form a solution with the monomer, and these include copper (II) nitrate, copper (II) chloride, etc. It has, also, been found that the position of the absorption maximum appears to be independent of the particular copper (II) salt used for doping of plastic filter. The amount of the copper salt added to the monomer provides means for varying the infrared absorption. Of course, the copper (II) salt must be compatible with the monomer, and in its solution must be soluble in the monomer in sufficient quantity to obtain the desired filtering action. The copper salt must neither precipitate from not crystallize in the cured plastic.

The polyester resins curing with little or no shrinkage or distortion, and the molds for parts may be made to desired dimensions of the finished product. By providing smooth surfaces in the mold, the surface of the cast parts will require little or no finishing. This is particularly valuable for lenses and the like where visibility through the part must be relatively undistorted. Also, the curing is sufficiently fast to maintain the salt uniformly distributed throughout most of the polyester matrix. The quantity of copper salt in the polyester matrix extends from about 0.5 to 5%, the larger quantity increasing the absorption of the infrared light. The solvent for the copper salt must be miscible with the monomer.

While there has been shown and described what are considered to be preferred embodiments of the present invention, it will be obvious to those skilled in the art that various changes and modifications may be made therein without departing from the spirit of the invention.

I claim:

1. An optical filter for shielding against ruby laser light comprising a cast and cured, polyester resin matrix of optical quality having dispersed throughout the matrix a copper (II) salt soluble in the monomer precursor of the polyester resin, the filter being characterized by having the copper (II) salt dispersed uniformly throughout the matrix without precipitates and crystallization, said copper (II) salt being present in the quantity sufficient to shield against ruby laser light, said filter characterized by a strong absorption peak at 694 nanometers.

2. An optical filter according to claim 1 wherein the copper (II) salt is copper (II) bromide.

3. An optical filter according to claim 1 wherein the copper (II) salt is copper (II) chloride.

4. An optical filter according to claim 1 wherein the copper (II) salt is a copper (II) nitrate.

5. An optical filter according to claim 1 wherein the polyester is a copolymer of an unsaturated ester and a vinyl-type monomer.

6. An optical filter according to claim 1 wherein the copper (II) salt is present in the cured resin matrix of from 0.5 to 5%.

7. A method of producing a cast optical filter for shielding against ruby laser radiation, the method comprising dissolving a copper (II) salt in a solvent; mixing the copper (II) salt containing solvent with a liquid unsaturated, polyester monomer precursor; adding an initiator to the monomer precursor and copper (II) salt solution; thoroughly mixing the initiator, monomer precursor, and copper (II) salt together; pouring the resultant mixture into a mold; and curing the resultant mixture for a sufficient time to form a cured polyester resin, said solvent being compatible with a polyester monomer precursor, said copper (II) salt being present in the quantity sufficient to shield against ruby laser radiation, said filter characterized by a strong absorption peak at 694 nanometers.

8. A method according to claim 7 wherein the curing is in two stages including a first low temperature cure at essentially room temperature and then a second higher temperature cure at a temperature of 140–160° F.

References Cited

UNITED STATES PATENTS

| 2,993,789 | 7/1961 | Crawford | 260—45.75 |
| 3,104,176 | 9/1963 | Hovey | 251—300 |
| 3,188,363 | 6/1965 | Amidon et al. | 260—45.75 |
| 3,216,969 | 11/1965 | Cyba | 260—45.75 |
| 3,266,913 | 8/1966 | Hardy | 260—45.75 |
| 3,446,766 | 5/1969 | Taylor | 260—45.75 |

GEORGE F. LESMES, Primary Examiner

J. P. BRAMMER, Assistant Examiner

U.S. Cl. X.R.

350—1